(12) United States Patent
Weidinger et al.

(10) Patent No.: US 6,702,087 B2
(45) Date of Patent: Mar. 9, 2004

(54) PRESSURE PLATE ASSEMBLY FOR A FRICTION CLUTCH

(75) Inventors: Reinhold Weidinger, Kolitzheim (DE); Joachim Lindner, Dittelbrunn (DE); Anton Doll, Theilheim (DE); Jürgen Streichsbier, Kirchlauter/Neubrunn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/004,394

(22) Filed: Dec. 4, 2001

(65) Prior Publication Data

US 2002/0079187 A1 Jun. 27, 2002

(30) Foreign Application Priority Data

Dec. 23, 2000 (DE) .......................................... 100 64 851

(51) Int. Cl.$^7$ ............................................. F16D 13/75
(52) U.S. Cl. ............................... 192/109 R; 192/70.25; 192/111 A
(58) Field of Search ......................... 192/70.25, 111 A, 192/109 R (56) References Cited

U.S. PATENT DOCUMENTS

| | | | |
|---|---|---|---|
| 6,123,180 A | 9/2000 | Weidinger | 192/70.25 |
| 6,371,269 B1 * | 4/2002 | Weidinger | 192/70.25 |
| 6,425,470 B2 * | 7/2002 | Weidinger | 192/70.25 |
| 6,443,285 B2 * | 9/2002 | Lindner et al. | 192/70.25 |
| 6,505,724 B2 * | 1/2003 | Weidinger | 192/70.25 |
| 6,510,933 B1 * | 1/2003 | Weidinger | 192/70.25 |
| 2001/0006140 A1 * | 7/2001 | Lindner et al. | 192/111 A |
| 2002/0040836 A1 * | 4/2002 | Weidinger et al. | 192/70.25 |
| 2002/0040837 A1 * | 4/2002 | Dobler et al. | 192/70.25 |
| 2002/0043439 A1 * | 4/2002 | Gorzitzke et al. | 192/70.25 |
| 2002/0043440 A1 * | 4/2002 | Gorzitzke et al. | 192/70.25 |
| 2002/0079186 A1 * | 6/2002 | Weidinger | 192/70.25 |

* cited by examiner

Primary Examiner—Charles A Marmor
Assistant Examiner—Eric M. Williams
(74) Attorney, Agent, or Firm—Cohen, Pontani, Lieberman & Pavane (57) ABSTRACT

A pressure plate assembly for a friction clutch including a housing having an axis of rotation; a pressure plate mounted in the housing with freedom to move axially relative to the housing; a stored-energy element mounted in the housing and transmitting force along a path from the housing to the pressure plate; a wear-compensating device in the path of force transmission, which device has at least one adjusting element free to move in an adjusting direction to compensate for wear; and a clearance-producing arrangement having at least one gripping element, which is attached to the assembly upon which the stored-energy element acts via the wear-compensating device. The minimum of one gripping element has a blocking section, by means of which it can make blocking contact with a blocking element when wear occurs. The clearance-producing arrangement also includes an arresting element which can be shifted in an arresting direction when the gripping element comes into contact with the blocking element, thereby arresting the gripping element in the shifted position correlating with the amount of wear which has occurred. A transport-securing device prevents moving the adjusting element in the adjusting direction and/or moving the arresting element in the arresting direction prior to attaching the housing to the centrifugal mass.

27 Claims, 10 Drawing Sheets

PRESSURE PLATE ASSEMBLY FOR A FRICTION CLUTCH

BACKGROUND OF THE INVENTION

1. Field of the Invention

The present invention pertains to a pressure plate assembly for a friction clutch, comprising a housing arrangement; a pressure plate held in the housing arrangement with freedom to move in the direction in which a rotational axis extends; a stored-energy element; a wear-compensating device acting in the path of force transmission between the stored-energy element and the pressure plate and/or the housing arrangement, which device has at least one adjusting element which can move in an adjusting direction to compensate for wear; and a clearance-producing arrangement, comprising at least one gripping element, which is attached to the assembly upon which the stored-energy element acts via the wear-compensating device. The minimum of one gripping element has a blocking section, by means of which it can make blocking contact with a blocking element when wear occurs, the clearance-producing arrangement also comprising an arresting element associated with the minimum of one gripping element. The arresting element can be displaced in the direction of the arresting motion upon the deflection, produced by the blocking system, of the minimum of one gripping element with respect to the assembly in question in order to arrest the gripping element in the deflected position associated with the amount of wear which has occurred.

2. Description of the Related Art

A pressure plate assembly with a design of this type is known from U.S. Pat. No. 6,123,180. Pressure plates of this type are usually manufactured by suppliers, who do not necessarily also produce the flywheels or clutch disks to be assembled with these pressure plates to arrive at a complete friction clutch. This means that these pressure plate assemblies are frequently delivered separately and are not attached to the clutch disks and flywheels to produce the complete friction clutches until they have arrived in the automotive assembly plant or some later production stage. This means that, in the stage before the pressure plate assembly is attached to the flywheel, there is initially no backing for the pressure plate. The stored-energy element, which is acting on the pressure plate, thus pushes the pressure plate outward from the housing arrangement; that is, there is no support such as that present after the flywheel and the clutch disk, which is situated between the pressure plate and the flywheel, have been attached. The flywheel and the clutch disk thus form a stop, which limits the movement of the pressure plate. A problem which exists in this type of production phase, i.e., the phase before the pressure plate has been attached to the flywheel, is that, as a result of the force exerted by the stored-energy element, the pressure plate can be pushed so far out of the housing arrangement that the gripping element (or the blocking section of the gripping element) enters into contact interaction with a blocking element, which can be attached, for example, to the housing arrangement. As a result, the subassemblies provided in the pressure plate assembly to respond to and to compensate for wear either go into operation or are brought into a state of readiness for such operation. This, however, would ultimately mean that an unwanted wear-compensating operation would occur later, when the clutch disk is pushed back into the housing arrangement as it being attached to the flywheel and the clutch disk. The first result of this is that the friction clutch would be installed in the wrong position, and the second is that the installation position of the stored-energy element would be changed, leading to a corresponding change in its force characteristic.

SUMMARY OF THE INVENTION

The present invention has the object of improving the design of a pressure plate assembly of the general type in question so that, in the state before the pressure plate assembly is attached to additional components of a friction clutch, unwanted wear adjustments or measures preparatory to such adjustment do not occur.

In the pressure plate assembly according to the invention, a transport-securing arrangement is also provided, by means of which, before the pressure plate assembly is attached to the centrifugal mass arrangement, the minimum of one arresting element can be prevented from moving in the arresting direction and/or the minimum of one adjusting element can be prevented from moving in the adjusting direction.

By providing a transport-securing arrangement, which is effective especially in those areas of the pressure plate assembly which are critical with respect to unwanted wear adjustments, it is possible in a reliable manner to prevent the occurrence of a compensating movement when, in the transport condition, the pressure plate moves past its normal installation point in the friction clutch under the force of the stored-energy element and then is pushed back again into the housing arrangement during the assembly process. By providing a transport-securing device, it is possible, for example, to avoid the necessity of having to wait to install the blocking element provided to interact with the gripping element or the necessity of having to wait to bring the blocking element into its final installation position until after the friction clutch has been assembled. The means that some of the work steps involved in the process of assembling a friction clutch can be eliminated.

For example, a transport-securing section cooperating with the minimum of one adjusting element can be provided on the arresting element. This can be realized, for example, by providing the arresting element with an arresting interaction area, which, upon the occurrence of wear and the completion of a wear-compensating operation, allows limited relative movement between the minimum of one adjusting element and the arresting element, and by designing the transport-securing section on the arresting element in such a way that, in the transport state, it allows essentially no relative motion between the minimum of one adjusting element and the arresting element.

To allow the defined adjusting movement of the minimum of one adjusting element during the normal operating condition of a friction clutch but at the same time to be able to secure the assembly suitably for transport, it is proposed that, in the operating state of the clutch, the arresting interaction area engage in a recess in the adjusting element, which recess is elongated in the adjusting direction and is longer in the adjusting direction than the arresting interaction area, and that the arresting element have, in the area of the transport-securing section, a length in the adjusting direction which is essentially the same as the length of the recess. It can also be provided in the pressure plate assembly according to the invention that the arresting interaction area extends essentially in the radial direction into the recess and that the transport-securing section adjoins the arresting interaction area in the radial direction.

The transport-securing device will basically continue to perform its function during the process of attaching the pressure plate assembly to the flywheel or the like. To render this device inoperable so that the desired wear compensation function can be carried out during the normal operation of the clutch, it is proposed that the transport-securing device be brought out of its transport-securing interaction with the recess by the action of centrifugal force. This makes it possible to eliminate a separate set of work procedures for deactivating the transport-securing device.

Especially in an embodiment in which the transport-securing device acts essentially in the area of interaction between the arresting element and the minimum of one adjusting element, it is preferable to provide a release force-producing device, which acts on the pressure plate in the direction opposite that in which the stored-energy element exerts its force, the releasing force produced by the release force-producing device preventing the minimum of one adjusting element from moving by itself in the adjusting direction. Because the automatic movement of the adjusting element is prevented even after the wear-compensating device has ultimately been clamped between the stored-energy element and the release force-producing device by the actuating force exerted by the release force-producing device, ultimately the minimum of one adjusting element forms the component by which the arresting element is prevented from moving in the direction of its arresting movement. Only when vibrations or shaking motions occur while the vehicle is actually being driven will the minimum of one adjusting element assume a condition in which it is free to slide relative to the component against which it is supported, and it will then be able to move in the adjusting direction when a clutch-release operation is executed and the force being exerted by the stored-energy element is interrupted.

According to an alternative design of the present invention, a transport-securing section can be provided on the arresting element, which securing section can be brought into transport-securing interaction with an opposing transport-securing section provided in the area of the assembly in question and which, once the transport-securing interaction has been established, allows essentially no movement of the arresting element in the arresting direction. Here, therefore, a direct arresting interaction is produced between the arresting element and the assembly in question or a component provided thereon, so that ultimately, to prevent the movement of the arresting element in the arresting direction, it is no longer necessary to make use of the intermediate agency of the minimum of one adjusting element. This results in the advantage that, in the transport state, any impact-like movements which may occur, which could briefly shake the minimum of one adjusting element loose, cannot lead to the movement of the arresting element itself.

For example, the arresting element can be provided with an elongated body area stretching out in the direction of the arresting movement, which body area carries the transport securing section at one end. Here, too, it is advantageous for the transport-securing interaction between the transport-securing section and the opposing transport-securing section to be interrupted by the action of centrifugal force. This can be achieved, for example, by providing an essentially radially oriented transport-securing projection on one of the two sections, i.e., on the transport-securing section or on the opposing transport-securing section, and by providing an opening facing in the radial direction on the other one of the two sections. In an especially preferred embodiment, which ultimately requires no additional parts or components for producing the transport-securing interaction, the opposing transport-securing section can be provided on the gripping element. This can be achieved, for example, by providing the opposing transport-securing section at or near the end of the gripping element intended to produce the blocking interaction.

So that the transport-securing interaction can be obtained in the state in which the pressure plate is shifted axially relative to the housing arrangement without interfering with normal clutch or wear adjustment operations in the normal state, i.e., the state in which the pressure plate is pulled back into the housing arrangement, it is proposed that the arresting element be provided with an elongated body area, by means of which it is or can be brought into arresting interaction with the minimum of one gripping element under operating conditions; that the transport-securing section on the arresting element extend essentially along the body area but at a certain axial distance; and that it be possible for a free end of the transport-securing device to be brought into transport-securing interaction with the gripping element.

According to another design variant of the present invention, which is especially easy to manufacture, it is possible to provide a transport-securing section on the arresting element, which securing section can be brought into transport-securing interaction with an opposing transport-securing section on the stored-energy element. It is possible, for example, for the transport-securing section to comprise a transport-securing projection extending toward the stored-energy element and for the opposing transport-securing section to comprise an opening, facing in the axial direction, in the stored-energy element, preferably an opening between two of the spring tongues. Here, too, the transport-securing interaction can be easily deactivated again without any additional work if the transport-securing interaction between the transport-securing section and the opposing transport-securing section is produced in the first place by the axial displacement of the pressure plate relative to the housing arrangement under the action of the stored-energy element, the extent of this displacement exceeding the normal installation position of the pressure plate relative to the housing arrangement.

According to another alternative embodiment of the present invention, a transport-securing section can be provided on the minimum of one adjusting element, which securing section can be brought into transport-securing interaction with an opposing transport-securing section provided on the gripping element. For example, the opposing transport-securing section can be formed in the area of the blocking section of the gripping element.

In this embodiment, too, the transport-securing interaction can again be easily deactivated if the transport-securing interaction between the transport-securing section and the opposing transport-securing section is produced in the first place by the displacement of the pressure plate relative to the housing arrangement to an extent exceeding the normal installation position.

For example, it can be provided in this embodiment that the blocking section of the gripping element extends between the minimum of one adjusting element and the pressure plate, and that the transport-securing section is formed on the minimum of one adjusting element so that it extends toward the pressure plate.

Especially in the embodiment in which a transport-securing interaction is produced directly with respect to the minimum of one adjusting element, it is advantageous for the arresting element to have an arresting interaction area which engages in the opening provided in the minimum of one adjusting element with a certain play in the adjusting direction. By providing the arresting element with only a small amount of possible movement relative to the minimum of one adjusting element, it can be assured at the same time that the arresting element will not shift excessively along the minimum of one adjusting elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
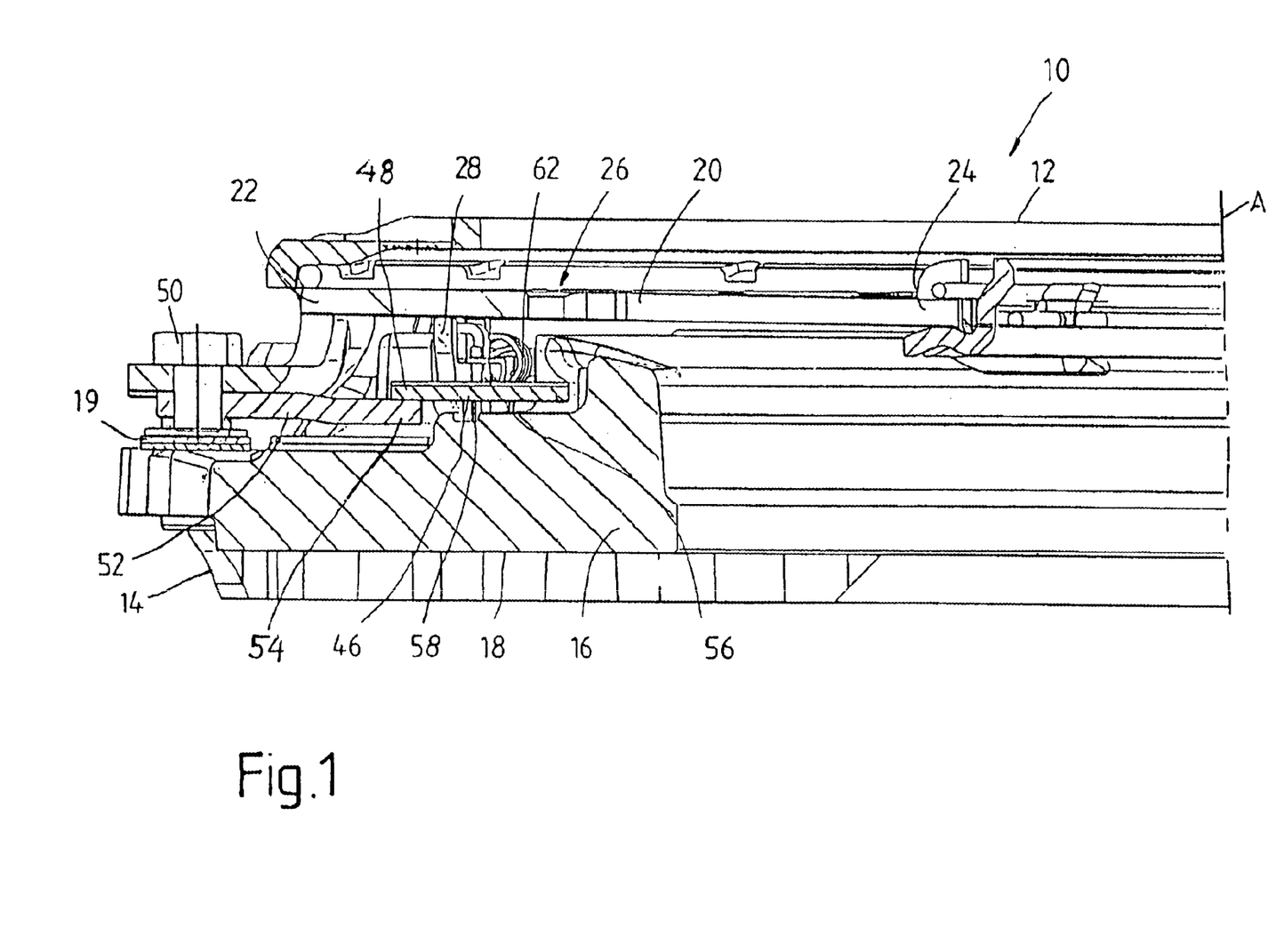
FIG. 1 is a partial longitudinal section of a pressure plate assembly according to the invention.
Figure 2:
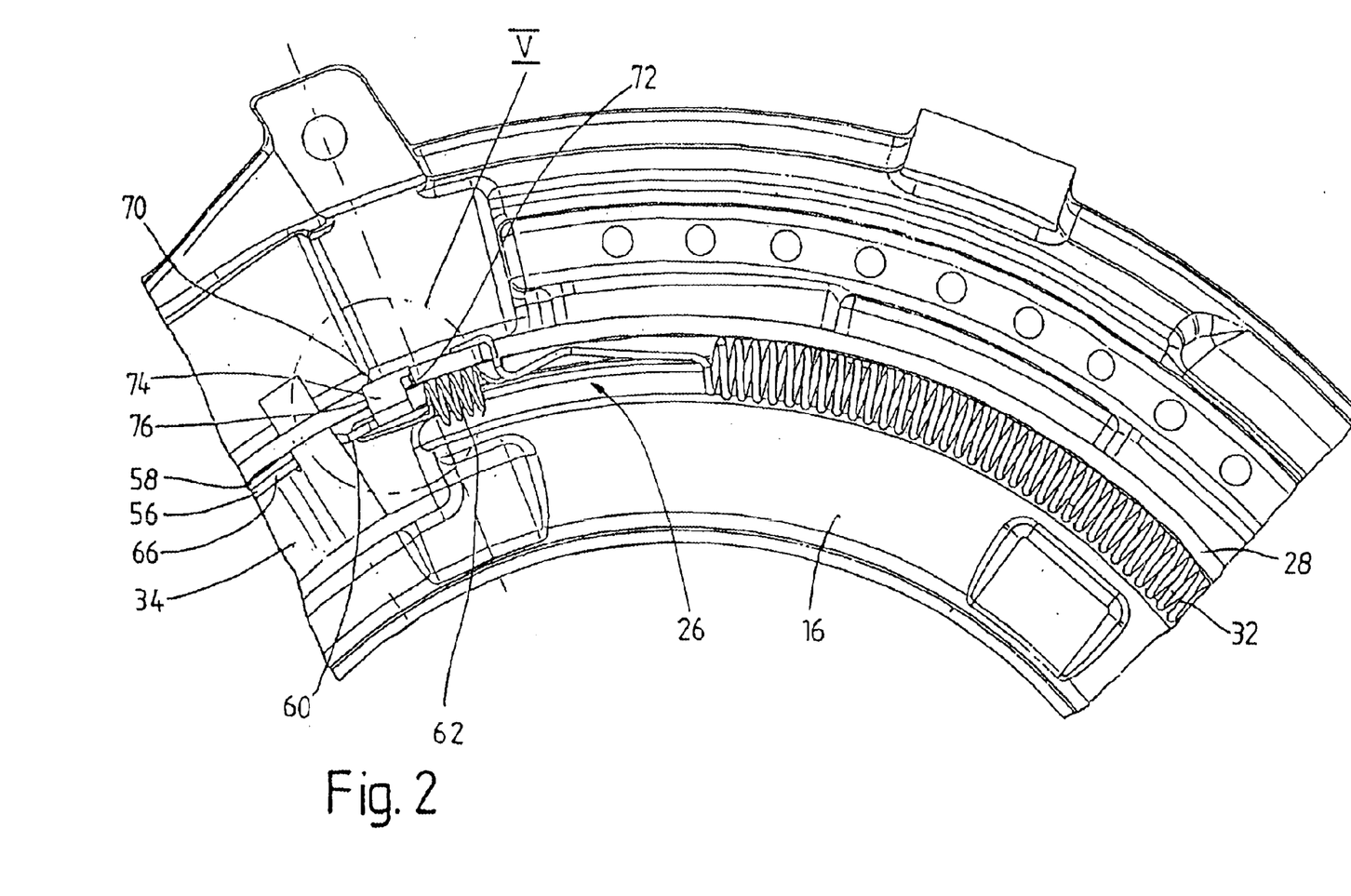
FIG. 2 is a partial axial view of the pressure plate assembly shown in FIG. 1 without the housing arrangement.
Figure 3:
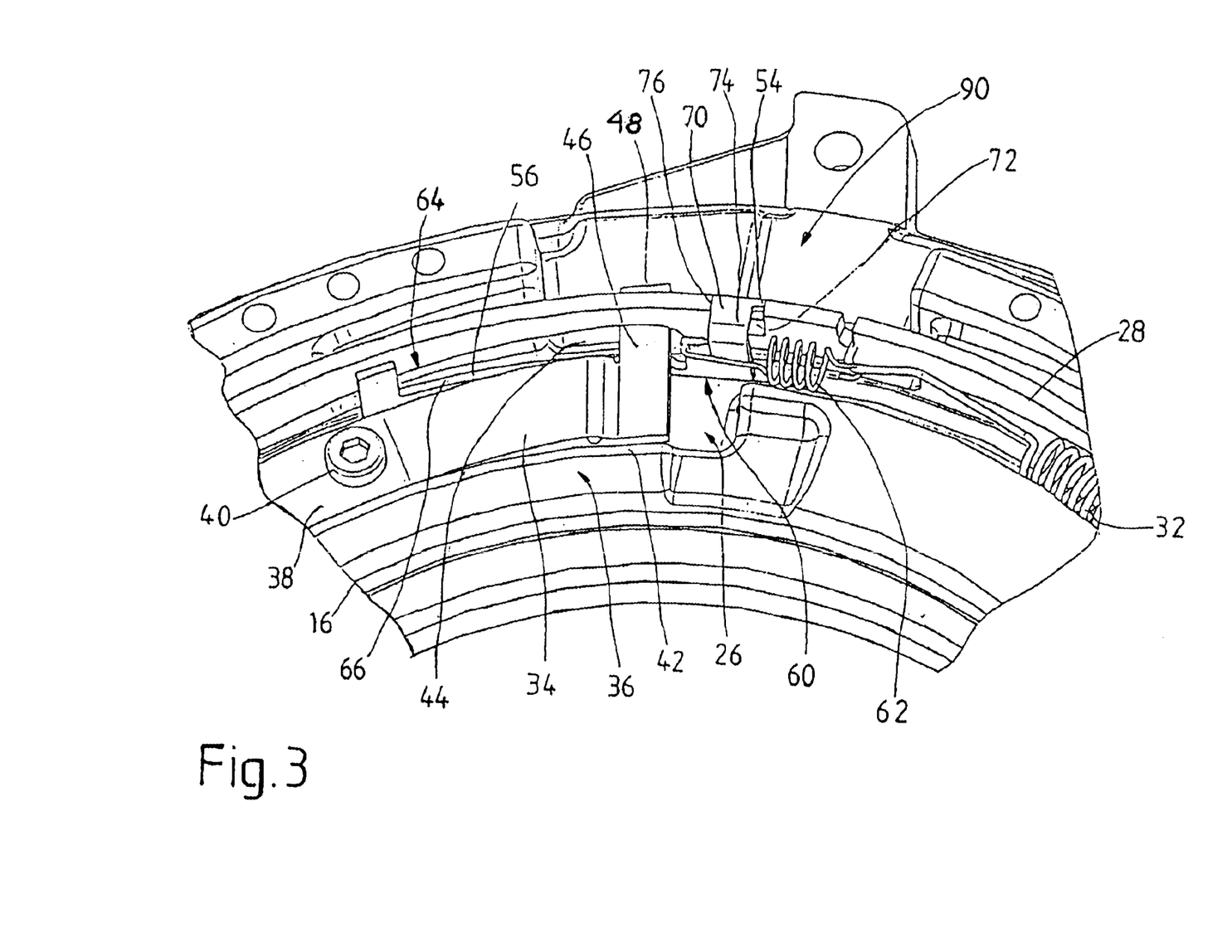
FIG. 3 is a perspective view of the same part of the pressure plate assembly as that in FIG. 2.

The pressure plate assembly 10 shown in FIGS. 1–3 comprises a housing 12, one axial end 14 of which is designed to be attached to a centrifugal mass arrangement, not shown in the figures, such as a one-piece flywheel or possibly a multiple-mass flywheel. Inside the housing 12 is a pressure plate 16, the friction surface 18 of which can be pressed against a clutch disk, not shown in the figures either, the clutch disk thus being pressed in turn against a corresponding friction surface of the centrifugal mass arrangement. The pressure plate 16 is connected to the housing 12 by tangential leaf springs 19 or the like with freedom to move in the direction in which a rotational axis A extends but is essentially prevented from rotating around the rotational axis A relative to the housing 12.

A stored-energy element 20 is also installed in the housing 12. The radially outer area 22 of this element is supported on the housing 12, and its radially inner area, in the area of so-called "spring tongues" 24, is designed to be acted upon by a release mechanism with a pulling type of action, whereas the radially central area of the pressure plate 16 acts on a wear-compensating device 26, which will be described below. It should be pointed out that the description of a stored-energy element 20 and of a pressure plate assembly 10 of the pull type is presented only by way of example. It should be obvious that the stored-energy element 20 could also be supported on the housing 12 at a point radially inside the area in which it exerts force via the wear-compensating device 26 on the pressure plate 16 and thus designed to be actuated by a release mechanism of the push type.

In the design example shown here, the wear-compensating device 26 comprises an adjusting ring 28. The adjusting ring 28 is supported on the pressure plate 16 and also serves to receive the force exerted by the stored-energy element, i.e., by the diaphragm spring 20. The surface areas of the adjusting ring 28 and of the pressure plate 16 which face each other have complementary slanted or key-like areas, which are designed with a key-like profile extending in the circumferential direction. The relative rotation of the adjusting ring 28 with respect to the pressure plate 16 has the result that the total axial length of the wear-compensating device 26, that is, the extent to which the adjusting ring 28 projects beyond the pressure plate 16, is changed. A helical tension spring 32, which is installed radially inside the adjusting ring 28, preloads the adjusting ring 28 for rotational motion with respect to the pressure plate 16. One end of the spring 32 engages with the adjusting ring 28, while the other end engages with the pressure plate 16.

A gripping element 34 of a clearance-producing arrangement 36 is also provided on the pressure plate 16, radially inside the adjusting ring 28. The gripping element 34 is attached at its circumferential end 38 to the pressure plate 16 by a threaded bolt 40, while the other circumferential end 42 of the gripping element 34 has a gripping section 46, which passes radially outward through a circumferential and axial slot 44 in the adjusting ring 28. The gripping element 34 is made of elastic material such as spring plate. The free terminal area 48 of the gripping section 46 of the gripping element 34 extends over a blocking element 52, which is attached to the housing 12 by means of a threaded bolt 50, for example. There is therefore a radial overlap, as can be seen especially clearly in FIG. 1, between the terminal area 48 and a corresponding terminal area 54 of the blocking element 52.

The gripping element 34 of the clearance-producing arrangement 36 is also provided with an arresting element 56. This arresting element 56 extends radially inside the adjusting ring 28, i.e., rests against its inside circumferential surface, and is guided in a corresponding recess 58 in the pressure plate 16. A second helical tension spring 62 acts on the circumferential end area 60 of the arresting element 56, while the other end of this spring 62 is fastened or hooked to the end of the helical tension spring 32 which cooperates with the adjusting ring 28, which can rotate in the circumferential direction around the rotational axis A, as will be described further below. Starting from its end area 60 and proceeding to its free end 64, the arresting element 56 becomes larger in the axial direction; that is, it has a key-like shape extending in the circumferential direction between the two ends 60, 64 with the result that the smallest axial dimension is present in the area where the gripping section 46 is positioned over the arresting element 56, as shown in FIG. 1, whereas the largest axial dimension is present in the area near the end 64. Through the action of the spring 62, the arresting element 56 is thus pretensioned in the circumferential direction and moved until its key-like surface 66 strikes the gripping section 46 of the gripping element 34 and can therefore no longer move any farther in the circumferential direction.

At its end 60, the arresting element 56 has an arresting section 70, which is bent radially toward the outside. This section engages in a circumferential opening 72 in the adjusting ring 28. An arresting interaction area 74 of the arresting section 70 has a circumferential extent which is shorter than the circumferential extent of the opening 72 in the adjusting ring 28. As a result of the gripping element 34, which is resting under pretension on the surface 66 of the arresting element 56, the arresting element 56 is basically unable to move in its preload direction, i.e., in the clockwise direction in FIG. 3. Accordingly, a circumferential end 76 of the opening 72 in the adjusting ring 28, which is preloaded by the spring 32 for rotation in the same direction, comes to rest against the arresting interaction area 74 of the arresting section 70 and is thus also prevented from rotating in the circumferential direction.

The way in which the pressure plate assembly 10 according to the invention functions in rotational operating mode, especially upon the occurrence of wear, is described in the following.

In the new, as yet unworn state of the friction linings normally provided on the clutch disk, the adjusting ring 28 assumes a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension. In this state, then, as already described, the adjusting ring 28 is prevented from rotating by the arresting element 56. In the engaged state, furthermore, the stored-energy element 20 is acting on the adjusting ring 28, with the result that the pressure plate 16, which in this situation is resting against the clutch disk, and the resulting opposing force provide another blocking effect on the adjusting ring 28, which also prevents it from moving.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the centrifugal mass arrangement when in the engaged state, which, in the illustration of FIG. 1, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the arresting element 56 as the pressure plate 16 continues to move in the axial direction. Because the arresting element 56 is preloaded by the spring 62, however, it immediately pushes its way into the gap forming as a result of the displacement of the gripping section 46 relative to the pressure plate 16 and thus fills this gap. It is now no longer possible for the gripping element 34 to move back toward the pressure plate. As a result of the previously described movement of the arresting element 56 into the gap which forms, the arresting section 70 of the element also shifts relative to the adjusting ring 28, so that a small gap is created between the arresting interaction area 74 and the circumferential end 76 of the opening 72. Because the stored-energy element 20 is basically always exerting its force on the adjusting ring 28 during the clutch-engaging process and then in the engaged state, the adjusting ring 28 cannot rotate in this state relative to the pressure plate 16, so that, initially, a small gap remains between the arresting interaction area 74 and the circumferential end 76 of the opening 72, the size of this gap ultimately corresponding to the amount of wear which has occurred.

During a subsequent clutch-disengaging process, however, the clamping action on the adjusting ring 28 essentially disappears as a result of the elimination or reduction of the force being exerted by the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32. The follow-up force for the pressure plate 16 provided by the tangential leaf springs 19 is calculated preferably so that, even though the adjusting ring 28 basically cannot rotate under the preloading effect of the helical tension spring 32 even in the absence of any force being exerted by the stored-energy element 20, the adjusting ring 28 will nevertheless ultimately be shaken loose from the pressure plate 16 by the shaking and vibrational movements present during rotational operation of the clutch and will be able to move relative to the pressure plate 16 in obedience to the preloading force of the helical tension spring 32.

During this relative rotation of the adjusting ring 28 and the accompanying sliding movement of the various slanted surface areas along each other, the wear-compensating device 26 changes its axial dimension until the adjusting ring 28 comes to rest again in the circumferential direction against the arresting interaction area 74. The axial dimension of the wear-compensating device 26, that is, the position of the adjusting ring 28 in the axial direction, has thus been changed to the same extent as that to which the gripping section 46 was previously raised from the key-like area of the pressure plate, this distance corresponding in turn essentially to the extent to which the pressure plate 16 has moved closer, as a result of wear, to the centrifugal mass arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device 56 for movement in the circumferential direction.

It should be pointed that, in principle, the design of the pressure plate assembly with wear compensation which has been described above can be modified in a wide variety of ways. In the preferred embodiment, the wear-compensating device 26 has only a single adjusting ring, which, when wear occurs and a compensation process is being performed, moves in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual key elements, which are actuated by associated spring arrangements and which cooperate with separate gripping elements, could also be provided.

In a pressure plate assembly 10, the basic design and function of which have been described above with reference to FIGS. 1–3, there is the fundamental problem that, before the housing arrangement 12 is attached to a flywheel, there is no backup support for the pressure plate 16. This means ultimately that, as a result of the force being exerted by the stored-energy element 20, the pressure plate 16 is pushed out of the housing arrangement 12, i.e., downward in the illustration according to FIG. 1. As this happens, the terminal area of blocking section 54 of the gripping element 34 comes into contact with the blocking element 52. Because the force exerted by the stored-energy element 20 is much stronger than the elastic force produced by the gripping element 34, which is designed in the form of a leaf-like spring, the installation position of the gripping element 34 will change relative to the pressure plate 16, and in particular the area of its gripping section 46 or blocking section 54 will move away from the pressure plate 16. This means, however, that a gap would form between the gripping section 46 and the arresting element 56, which would lead in turn to the situation that, as the arresting element 56 shifts in the arresting movement direction, the pressure plate assembly 10 would arrive prematurely in a state in which it is prepared to perform a wear-compensating operation. This is so because subsequently, during the execution of a clutch-release operation, that is, when the force exerted by the stored-energy element 20 is no longer acting and only the tangential leaf springs 19 are exerting any pressure, the adjusting ring 28 would move in the circumferential direction under the effect of shaking or vibration until it makes contact again with the arresting interaction area 74 of the arresting element 56. To prevent this and thus to ensure that an assembly state appropriate to an unworn clutch is obtained during or after the attachment of the pressure plate assembly to a flywheel and a clutch disk, measures are provided in the pressure plate assembly according to the invention which prevent this type of unwanted displacement of the various components while they are in the state before the attachment to the flywheel. These measures are described in detail below.

Figure 4:
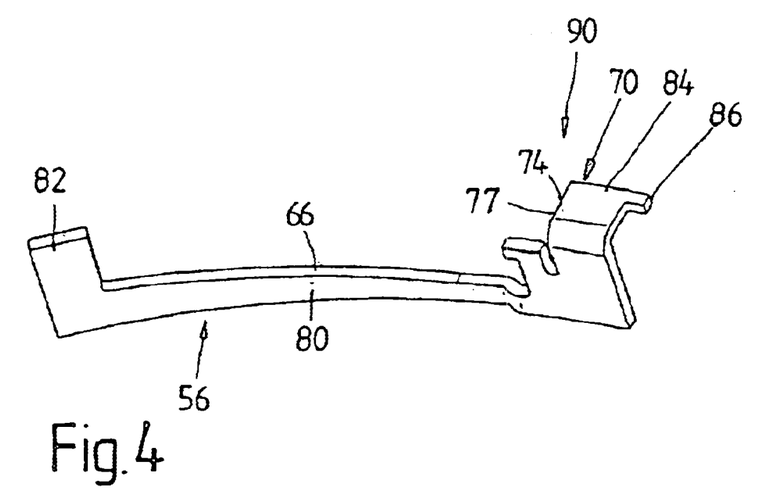
FIG. 4 is a perspective view of the arresting element used in the pressure plate assembly according to FIG. 1.
Figure 5:
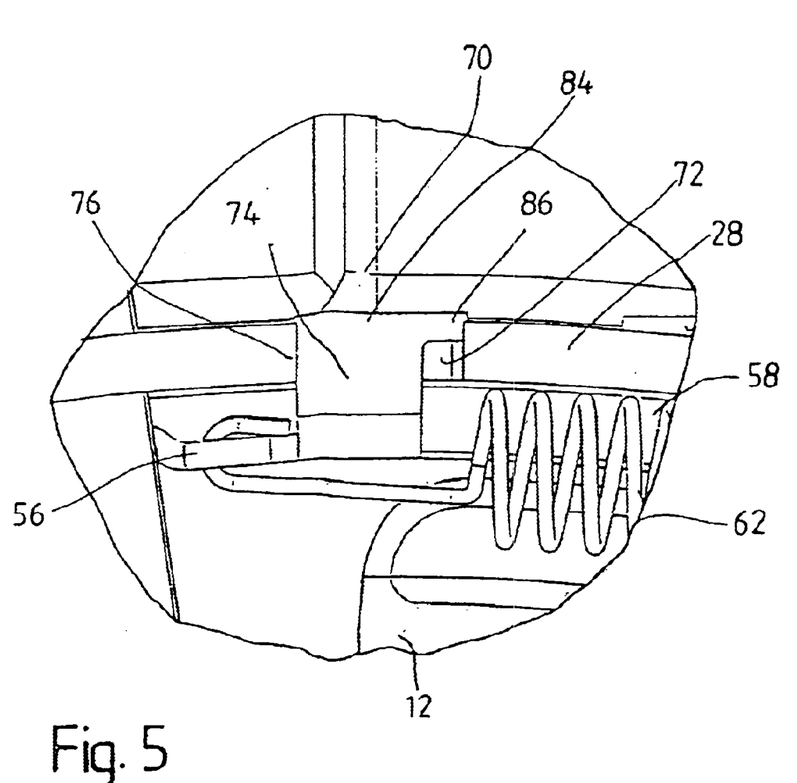
FIG. 5 is an enlarged view of the detail inside circle "V" in FIG. 2.

First, we see in FIG. 4 the basic design of the arresting element 56. This has a body area 80, which extends in the circumferential direction, which is ultimately the same direction as that in which the arresting movement occurs. The body has a slanted or key-like surface 66 on the side facing away from the pressure plate 16. At the first end, an axially projecting tab 82 is provided, which ultimately defines the maximum degree of wear compensation, because, when this tab makes contact with the gripping section 46, the arresting element 56 is no longer able to move. At the other end, the arresting section 70 is bent over toward the side, away from the body area 80, this bent section forming the arresting interaction area 74 and also the contact edge 77. At its free end, the arresting section 70 has a transport-securing section 84, adjoining the arresting interaction area 74. Whereas, as described above, the length of the arresting section 70 in the circumferential direction is at least slightly smaller in the area of the arresting interaction area 74 than the corresponding dimension of the opening 72, the transport-securing section 84 has a length in the circumferential direction, produced essentially by a circumferential projection 86, which is essentially the same as the circumferential length of the opening 72. In the installed state, i.e., the state in which the arresting element 56 finds itself after it has been installed but before the flywheel has been attached, this arresting element, as can be seen in FIGS. 2, 3, and 5, is shifted slightly in the recess 58 in the radial direction toward the inside, i.e., away from the adjusting ring 28, so that the transport-securing section 84 engages at least partially in the radial direction in the opening 72; the arresting interaction area is thus shifted laterally or radially toward the inside relative to the opening 72. In this state, therefore, no relative movement is possible initially between the adjusting ring 28 and the arresting element 56. In addition, the adjusting ring 28 cannot shift initially relative to the pressure plate 16 either, because, as already explained, the tangential leaf springs 18 generate an opposing force so great that the pretensioning force exerted on the adjusting ring 28 by the spring 32 is not sufficient to shift the ring in the circumferential direction. This cannot happen until the assembly is shaken sufficiently during the operation of the vehicle.

Figure 6:
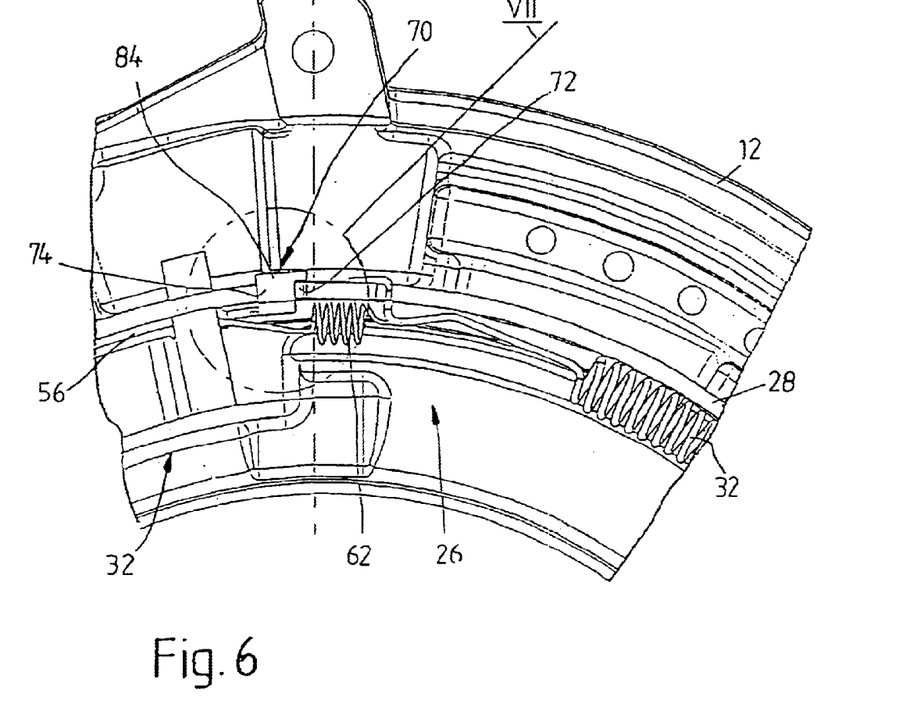
FIG. 6 is a view similar to that of FIG. 2 of the pressure plate assembly in the deactivated transport-securing interaction state.
Figure 7:
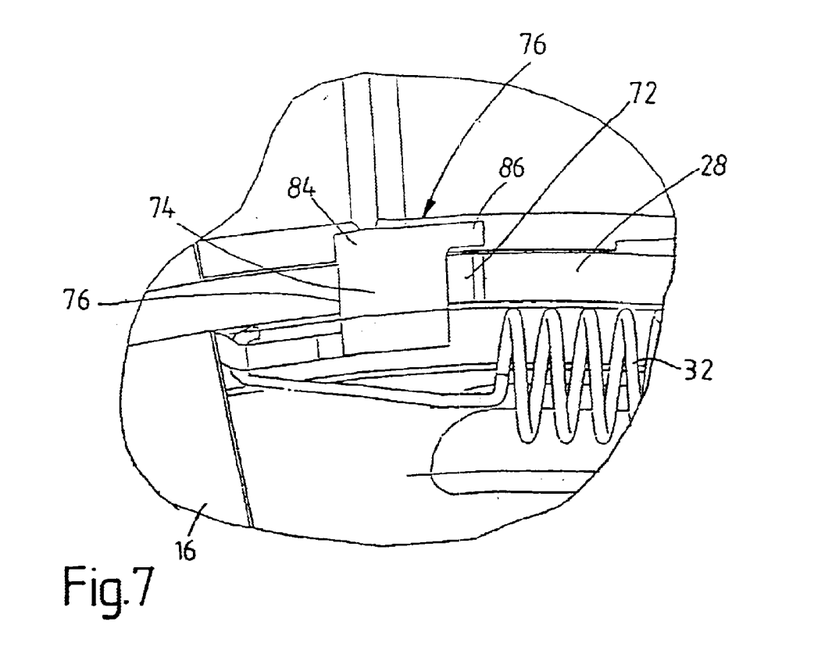
FIG. 7 is an enlarged view of the detail inside circle "VII" in FIG. 6.

When the pressure plate assembly 10 is finally attached to a flywheel and a clutch disk to produce the friction clutch and this complete clutch is integrated into a drive train, the centrifugal force which develops during rotational operation will pull the arresting element 56 radially outward, i.e., upward in the diagram of FIG. 5, inside the recess 58, in which it has a small amount of radial play. As this happens, the projection 86 of the transport-securing section 84 leaves the opening 72, and the arresting interaction area 74 alone occupies the area of the opening 72. Thus the arresting element 56 is again free to move slightly relative to the adjusting ring 28 in the circumferential direction, so that, when in rotational operation and upon the occurrence of wear, the gripping element 34 is shifted slightly relative to the pressure plate 16, the arresting element 56 is free to move in the arresting movement direction, that is, in the circumferential direction, and, during a subsequent clutch-release operation, the adjusting ring 28 is finally free to move in the adjusting direction to the same extent and in the same circumferential direction as the arresting element 56 previously did, until it again comes into contact with the edge 77. This state, in which the wear-compensating device 26 is finally ready in principle to perform its function, is illustrated in FIGS. 6 and 7.

In this embodiment, the transport-securing function of the transport-securing device 90 is achieved in that, during the transport state, the adjusting ring 28 is also basically unable to move and thus ultimately provides the support for the arresting element 56.

Figure 8:
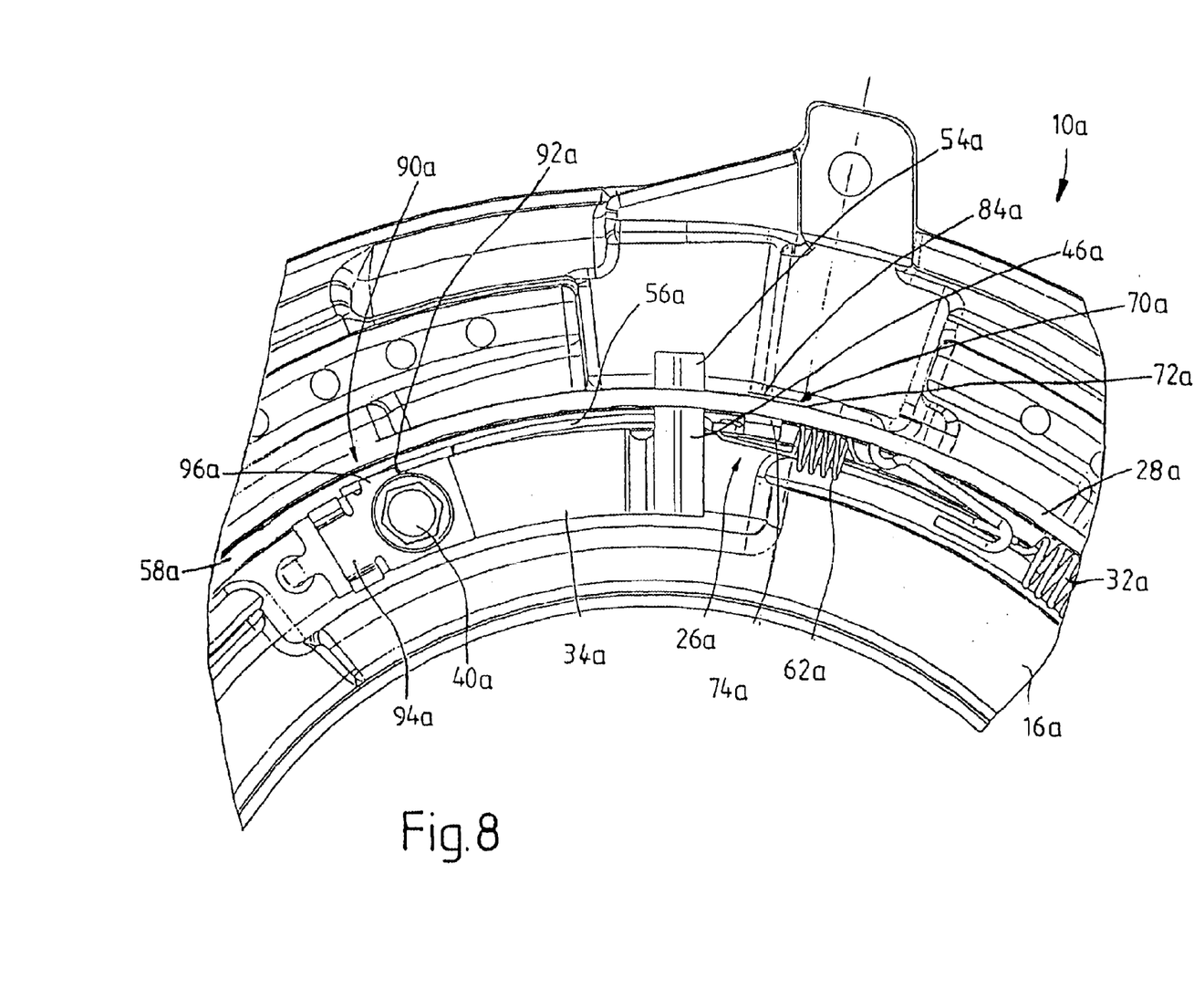
FIG. 8 is another view, similar to that of FIG. 2, of an alternative design of the pressure plate assembly according to the invention.
Figure 9:
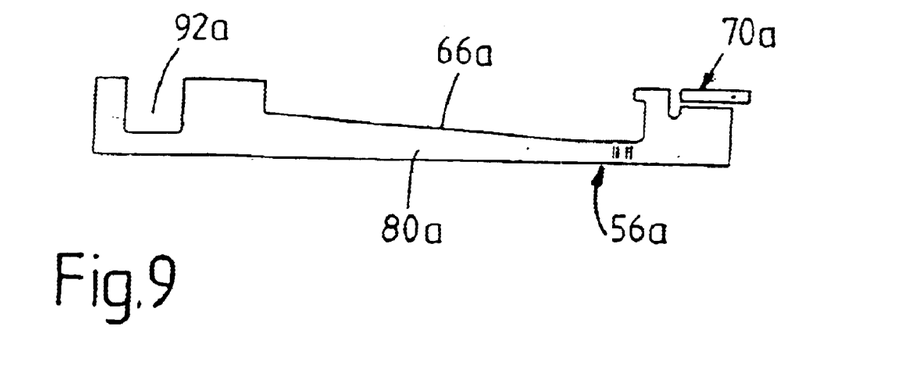
FIG. 9 is a side view of an arresting element used in the design according to FIG. 8.
Figure 10:
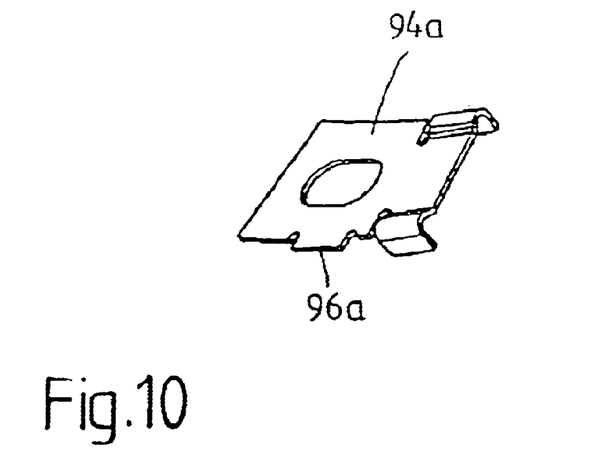
FIG. 10 is a perspective view of a transport-securing part used in the design according to FIG. 8.
Figure 11:
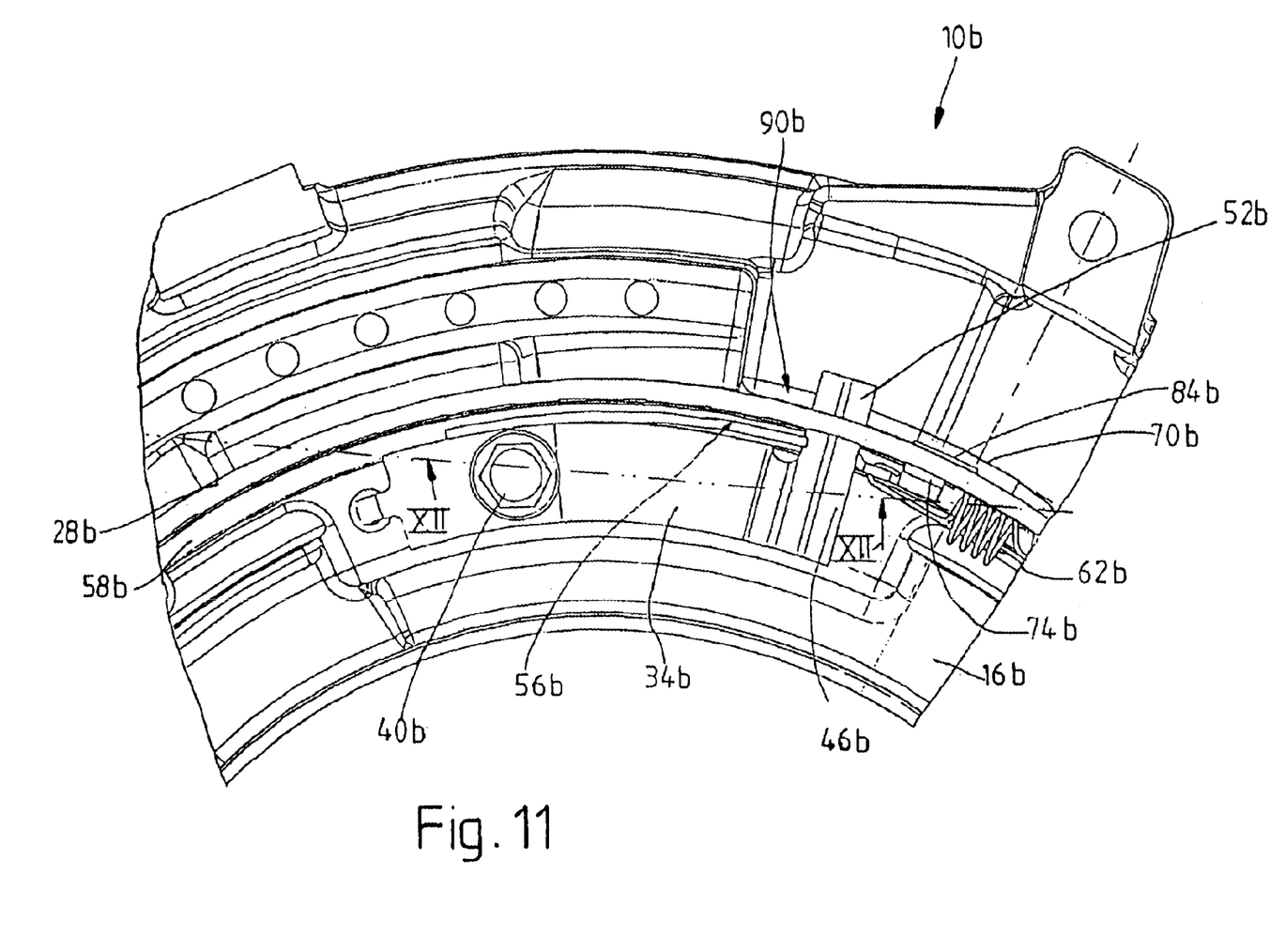
FIG. 11 is another view similar to that of FIG. 2 of an alternative design of the pressure plate assembly according to the invention.

An alternative embodiment of the pressure plate assembly according to the invention, i.e., of the transport-securing device realized in it, is shown in FIGS. 8–10. Components which are the same as those described above with respect to their design and function are designated by the same reference numbers with the addition of an "a". In the following, only the differences in the design, specifically in the area of the transport-securing device, will be discussed. The basic operation and design of the pressure plate assembly are the same as described in detail above.

It can be seen in the diagram of FIG. 9 than the arresting element 56a has an opening 92a at one end of its body area 80a. A transport-securing projection 96a extends radially outward from a transport-securing part 94a, which, together with the gripping element 34a, is attached to the pressure plate 16a by means of the threaded bolt 40a. This transport-securing part can be made out of sheet metal by stamping and forming, for example. The circumferential length of this securing projection is essentially the same as the circumferential length of the opening 92a. In the state shown in FIG. 8, in which the transport-securing device 90a has been put into the operating condition and in which one end of the arresting element 56a is shifted radially inward in the recess 58a and thus is not in contact with the inside circumferential surface of the adjusting ring 28a, the transport-securing projection 96a engages in the opening 92a in the radial direction. The arresting element 56a is therefore prevented from moving in the circumferential direction and is not able to move in the circumferential direction either even when the gripping section 46a is lifted from the surface 66a. It therefore remains in the installation position intended for a new clutch. Only as a result of the centrifugal forces which occur during rotational operation, that is, in the fully assembled state of the clutch, will the arresting element 56a be pushed radially outward against the inside circumferential surface of the adjusting ring 28, with the result that the arresting projection 96a will disengage from the opening 92a, and now there will no longer be anything in this area to prevent the arresting element 56a from moving.

In the case of the transport-securing device 90a shown in FIGS. 8–10, there is therefore basically a direct transport-securing action on the arresting element 56a relative to the pressure plate 16a or on a component attached to it, which means that it is no longer necessary to make intermediate use of the adjusting ring 28a. Any unwanted shaking or dropping onto surfaces, etc., or any movement of the adjusting ring 28a which may be thus induced cannot lead to a corresponding movement of the arresting element 56a.

To secure the adjusting ring 28a also in a design such as this, so that unwanted shaking cannot lead to the movement of the ring in the adjusting direction, the other end of the arresting element 56a, i.e., the area of its arresting section 70a, can be designed as described above in connection with FIGS. 1–7. This means that a transport-securing section 84a, which engages in the adjusting ring 28a, i.e., in the opening 72a in the ring, can again be provided, which securing section leaves the opening in the adjusting ring 28a only under the effect of centrifugal force and the resulting displacement of the arresting element 56a radially toward the outside, thus leaving the ring free to rotate. It should be pointed out, however, that, in principle, even in the absence of a transport-securing section 84a, relative rotation between the adjusting ring 28a and the arresting element 56a and thus between the adjusting ring and the pressure plate 16a in the transport state is possible only to the extent to which the arresting interaction area 74a has circumferential play in the opening provided in the adjusting ring 28a. It would be possible to take movement to this extent into account in the design of the slanted surfaces of the pressure plate 16a and of the adjusting ring 28a.

It should be pointed out that, even if the transport-securing part 94a is omitted, the transport-securing projection 96a could be provided directly on the gripping element 34a formed out of spring sheet steel or the like.

Another type of embodiment of a pressure plate assembly according to the invention is illustrated in FIGS. 11–14. Components which are the same as those described above with respect to design and/or function are designated by the same reference numbers with the addition of a "b". Here, too, only the design-related and functional differences in the area of the transport-securing device are discussed below.

Figure 12:
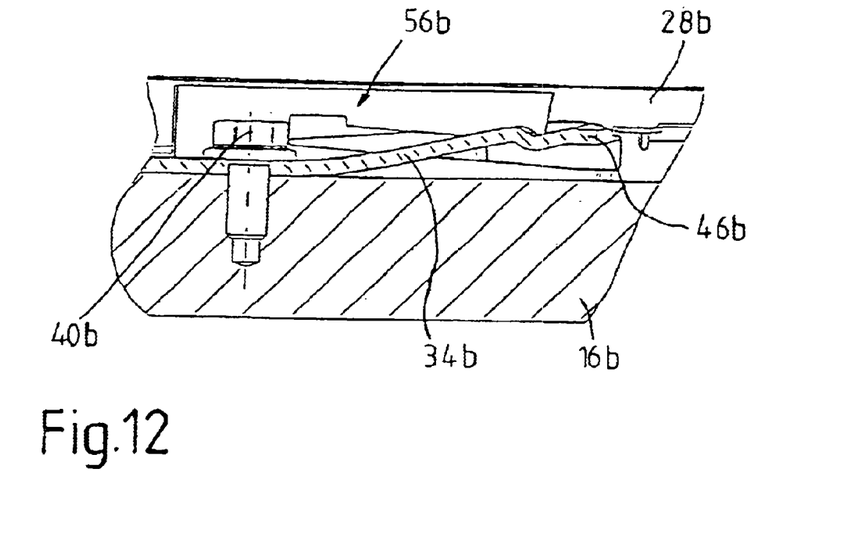
FIG. 12 is a partial sectional view along line XII—XII of FIG. 11.

In the case of the design variant shown in FIGS. 11–14, the transport-securing device 90b comprises a transport-securing section 100b on the arresting element 56b. The transport-securing section 100b, proceeding from the axial projection 82b at one end of the body area 80b, is essentially parallel to the body area 80b and is a certain axial distance away from it, so that a gap 102b is created between the body area 80b and the transport-securing section 100b. At 104b, the transport-securing section 100b ends a certain circumferential distance away from the arresting section 70b. In FIG. 12, we can see the state in which, as a result of the axial displacement of the pressure plate 16b relative to the housing arrangement and the consequent interaction of the blocking section 52b with the blocking element (not visible), the gripping element 34b has been shifted relative to the pressure plate 16b, possibly so far that it comes to rest against the adjusting ring 28b. When this happens, blocking section 52b or gripping section 46b of the gripping element 34b arrives in front of the circumferential end of the transport-securing section 100b, that is, in front of the edge 104b. The gripping element 34b itself thus forms the component which prevents the transport-securing section 100b and thus the entire arresting element 56b from moving in the circumferential direction, that is, from moving in the direction of an arresting movement. Only luring the subsequent return movement of the pressure plate into the housing arrangement is the arresting element 56b again released to move in the circumferential direction.

Figure 13:
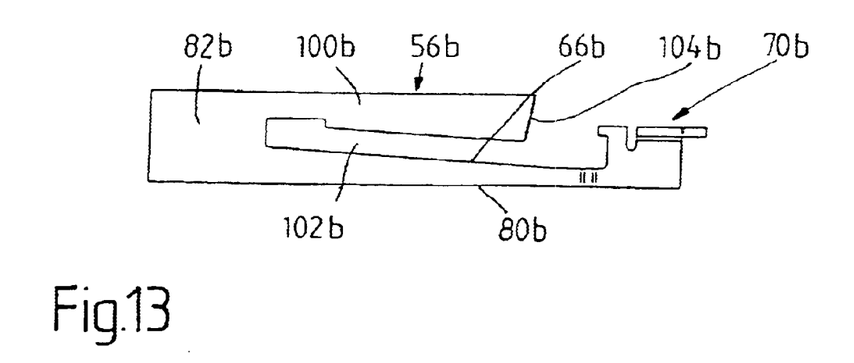
FIG. 13 is a side view of the arresting element used in the design according to FIG. 11.
Figure 14:
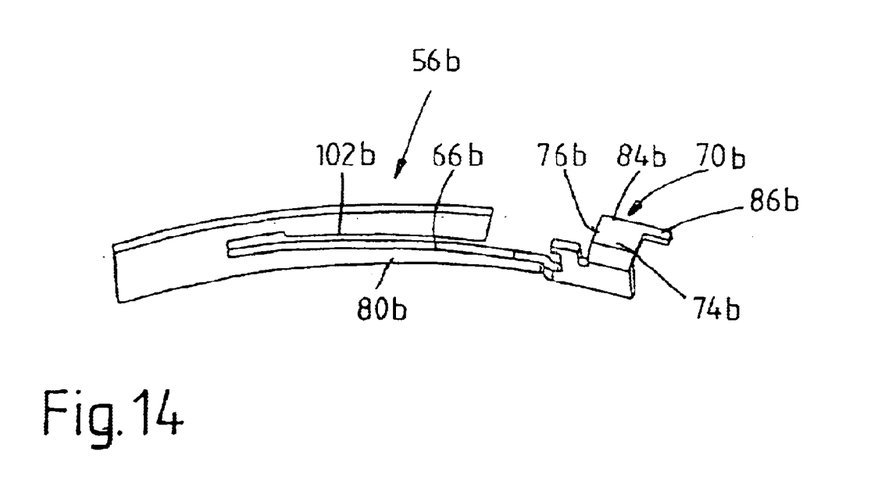
FIG. 14 is a perspective view of the arresting element visible in FIG. 13.

It is also possible in this embodiment, as described above, for the transport-securing device 90b to have the transport-securing section 84b on the arresting section 70b of the blocking element 56b, as can been especially clearly in FIG. 14. As a result, the arresting element 56b also secures the adjusting ring 28b against movement during transport; this securing function lasts until, as described above, the arresting element 56b has moved back outward again to make contact with the inside circumferential surface of the adjusting ring 28b under the effect of centrifugal force. The provision of this transport-securing section 84b, in the design embodiment shown in FIGS. 11–14, is advantageous in another way as well. During the transition of the gripping element 34b between a state in which it acts on the surface 66b of the arresting element 56b and the state in which it ultimately prevents the movement of the arresting element 56b by direct contact with the transport-securing projection 100b, there would in principle be nothing to prevent the arresting element 56b from moving. This means that the arresting element 56b could move relative to the adjusting ring 28b at least to the extent to which the arresting interaction area 74b has clearance in the opening in the adjusting ring 28b. It is true that this could be taken into account during the design phase of the pressure plate assembly and that a slight adjusting movement when the first clutch-release operation is executed could be tolerated. But if the transport-securing section 84b is initially still performing its function and thus preventing this movement of the arresting element 56b during the short time that it is not being acted on by the gripping element 34b, even this minimal movement will not be possible, with the result that the arresting element 56b will remain exactly in its installed position. In this design embodiment, therefore, the arresting element 56b also serves a transport-securing function for the adjusting ring 28b when the gripping element 34a is preventing the arresting element 56b from moving; at the same time, however, the adjusting ring 28b serves a motion-preventing function for the arresting element 56b, when, during transition phases, the gripping element 34b cannot prevent the arresting element 56b from moving. principle be nothing to prevent the arresting element 56b from moving. This means that the arresting element 56b could move relative to the adjusting ring 28b at least to the extent to which the arresting interaction area 74b has clearance in the opening in the adjusting ring 28b. It is true that this could be taken into account during the design phase of the pressure plate assembly and that a slight adjusting movement when the first clutch-release operation is executed could be tolerated. But if the transport-securing section 84b is initially still performing its function and thus preventing this movement of the arresting element 56b during the short time that it is not being acted on by the gripping element 34b, even this minimal movement will not be possible, with the result that the arresting element 56b will remain exactly in its installed position. In this design embodiment, therefore, the arresting element 56b also serves a transport-securing function for the adjusting ring 28b when the gripping element 34a is preventing the arresting element 56b from moving; at the same time, however, the adjusting ring 28b serves a motion-preventing function for the arresting element 56b, when, during transition phases, the gripping element 34b cannot prevent the arresting element 56b from moving.

Figure 15:
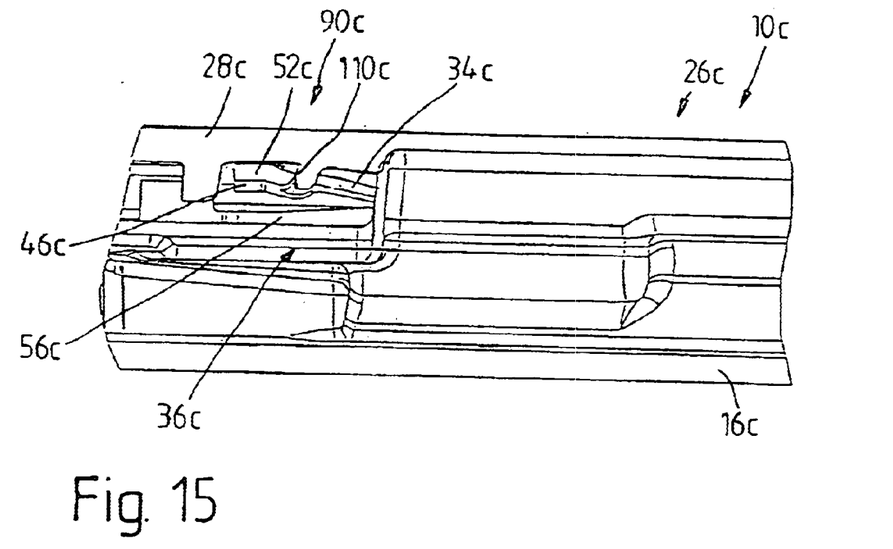
FIG. 15 is a partial radial view of another design of the pressure plate assembly according to the invention.

FIG. 15 shows yet another design embodiment of the pressure plate assembly according to the invention. Components which are the same as those described above with respect to design and/or function are designated by the same reference numbers with the addition of a "c". Here, too, only the differences existing in the area of the transport-securing device will be discussed.

It can be seen in FIG. 15 that the transport-securing device 90c creates a direct transport-securing interaction between the gripping element 34c and the adjusting ring 28c. For this purpose, the adjusting ring 28c has a transport-securing projection 110c extending toward the pressure plate 16c from the side facing the pressure plate 16c. When the pressure plate assembly 10 is new, this projection is located so that, when the pressure plate 16c moves out of the housing arrangement under the action of the stored-energy element and the associated deflection of the gripping element 34c with respect to the pressure plate 16c, the blocking section 52c or the gripping section 46c of the gripping element 34c grips behind the transport-securing projection 110c. Even when shaking occurs, the spring-loaded pretensioning force acting on the adjusting ring 28c thus cannot cause the ring to rotate. If, in this embodiment, the arresting element 56c is also designed as described above especially with reference to FIG. 1, then simultaneously a transport-securing function is provided for the arresting element 56c. Of course, the arresting element 56c could also be designed as shown in FIG. 13. Even in cases where the arresting element 56c has the normal design without any transport-securing measures of any kind, it would be possible for it to move only to the extent of the play present between the arresting interaction area and the opening in the adjusting ring 28c. This, too, could also be taken into account from the very beginning in the design of the pressure plate assembly 10, so that this possible movement would not lead to a displacement which, in the new state, would cause a significant change in the installation position of the stored-energy element. For example, a possible movement of this type could be compensated by preventing the slanted surfaces of the adjusting ring 28c and the pressure plate 16c from interacting with each other in this state and by allowing such interaction only after the adjusting ring 28c has shifted minimally as a result of the first clutch-release operation. An arrangement of this type could, of course, also be used in the other design embodiments described above.

Figure 16:
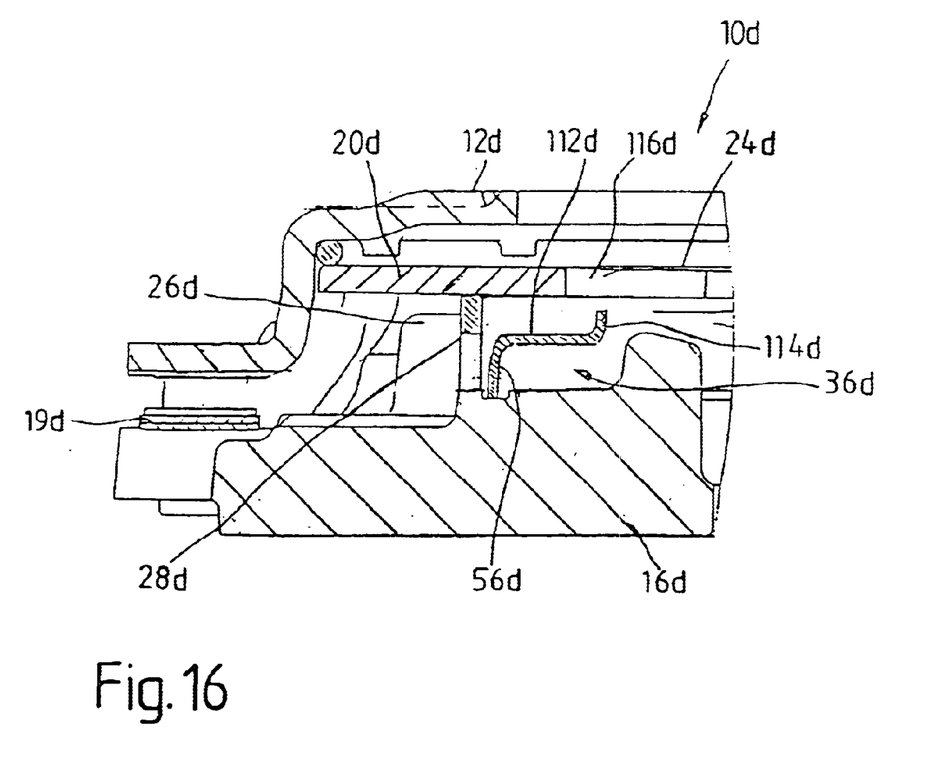
FIG. 16 is a partial longitudinal section of another design variant of a pressure plate assembly according to the invention.

Another design embodiment of a pressure plate assembly according to the invention is shown in FIG. 16. Components which are the same as those described previously with respect to design and/or function are designated by the same reference numbers with the addition of a "d".

In the embodiment according to FIG. 16, the arresting element 56d has a shoulder 112d extending from the side, that is, in the radial direction. The radial end of this shoulder is bent in the axial direction to form a transport-securing section 114d. This transport-securing section 114d is radially near the spring tongues 24d of the stored-energy element 20d. The positioning in the new state is such that a gap 116d between two spring tongues 24d is immediately opposite the transport-securing projection 114d in the axial direction. After the pressure plate assembly 10d has been installed and the pressure plate 16d has been released, the stored-energy element 20d tries to press the pressure plate 16d out of the housing arrangement 12d. As a result, the stored-energy element 20d becomes deformed in such a way that its radially inner area, that is, the spring tongues 24d, approach the pressure plate 116d. Then the transport-securing projection 114d enters the gap 116d axially opposite it. The arresting element 56d is thus again prevented from moving in the circumferential direction, that is, in the direction of an arresting movement, even if the gripping element (not visible in FIG. 16) has been shifted by contact with the blocking element (not visible either) with respect to the pressure plate 16d and thus lifted from the arresting element 56d. If desired, it is also possible in this embodiment to design the arresting section of the arresting element 56d in the same way as described above in connection with FIG. 1.

The present invention provides various transport-securing measures, all of which ensure that neither the arresting element nor the adjusting element will be able to execute an undesirable or unsuitable adjusting movement when, during transport or during the transition to the transport state, the gripping element comes to rest against the blocking element and a blocking function for the arresting element cannot be provided in the manner present during the operating state.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, comprising
   a housing having an axis of rotation,
   a pressure plate mounted in said housing with freedom to move axially relative to said housing,
   a stored energy element mounted in said housing and transmitting force along a path from said housing to said pressure plate,
   a wear-compensating device in the path of force transmission, said wear-compensating device comprising at least one adjusting element which is movable in an adjusting direction to compensate for wear,
   a blocking element which can be fixed in position relative to said housing,
   a gripping element attached to said pressure plate, said gripping element blocking said at least one adjusting element against movement in said adjusting direction before wear occurs, said gripping element coming into contact with said blocking element when wear occurs,
   an arresting element which can be shifted in an arresting direction when said gripping element comes into contact with said blocking element, thereby arresting the gripping element in a position corresponding to the amount of wear which has occurred, and
   transport securing means for preventing at least one of moving the adjusting element in the adjusting direction and moving the arresting element in the arresting direction prior to attaching the housing to a centrifugal mass, said transport securing means comprising at least one of means for releasing said adjusting element for movement in the adjusting direction by the action of centrifugal force on said arresting element, and means for releasing the arresting element for movement in the arresting direction by the action of centrifugal force on the arresting element.

2. A pressure plate assembly as in claim 1 wherein the arresting element comprises a transport securing section which cooperates with said adjusting element to prevent moving the adjusting element in the adjusting direction prior to attaching the housing to a centrifugal mass.

3. A pressure plate assembly as in claim 2 wherein the arresting element comprises an arresting interaction area which permits relative movement between the adjusting element and the arresting element when wear occurs, and the transport securing section allows essentially no relative movement between the adjusting element and the arresting element prior to attaching the housing to a centrifugal mass.

4. A pressure plate assembly as in claim 3 wherein the adjusting element comprises an elongate opening extending in the adjusting direction and having a length which is longer than the arresting interaction area, said arresting interaction area engaging in said opening during operation, the transport securing section having a length in the adjusting direction which is essentially the same as the length of the opening.

5. A pressure plate assembly as in claim 4 wherein said arresting interaction area extends essentially radially into said elongate opening, and said transport-securing section extends radially from said arresting interaction area.

6. A pressure plate assembly as in claim 4 wherein said transport-securing section is disengageable from said opening by the action of centrifugal force.

7. A pressure plate assembly as in claim 3 further comprising means for producing a release force in a direction opposite to the force transmitted by said stored energy element, said release force preventing said adjusting element from moving by itself in the adjusting direction.

8. A pressure plate assembly as in claim 1 wherein the arresting element comprises a transport securing section which can be brought into transport-securing interaction with an opposing transport-securing section, said transport-securing interaction essentially preventing the arresting element from moving in the arresting direction.

9. A pressure plate assembly as in claim 8 wherein said arresting element has an elongated body section extending in the arresting direction, the transport-securing section on the arresting element being provided at one end of said body section.

10. A pressure plate assembly as in claim 8 wherein said transport securing interaction can be deactivated by centrifugal force.

11. A pressure plate assembly as in claim 10 further comprising a transport securing projection extending essentially radially from one of said transport-securing section of arresting element and said opposing transport securing section, and an opening in the other of said transport securing section of said arresting element and said opposing transport securing section.

12. A pressure plate assembly as in claim 8 wherein said opposing transport-securing section is provided on said gripping element.

13. A pressure plate assembly as in claim 12 wherein said opposing transport-securing section is provided on said gripping element where contact with said blocking element occurs.

14. A pressure plate assembly as in claim 12 wherein said arresting element comprises an elongate body area which can be brought into arresting interaction with the gripping element, the transport-securing section on the arresting element extending essentially parallel to and axially spaced said body area and having a free end which can be brought into securing interaction with the gripping element.

15. A pressure plate assembly as in claim 1 wherein said arresting element comprises a transport-securing section which can be brought into transport-securing interaction with an opposed transport-securing section on said stored energy element.

16. A pressure plate assembly as in claim 15 wherein said transport-securing section on said arresting element comprises a transport-securing projection extending axially toward said stored energy element, said opposed transport-securing section having an opening which is open in the axial direction.

17. A pressure plate assembly as in claim 15 wherein said transport securing interaction can be produced by axial displacement of the pressure plate relative to the housing, said displacement being induced by said stored energy element and exceeding the installation position of the pressure plate relative to the housing.

18. A pressure plate assembly as in claim 1 wherein said adjusting element comprises a transport-securing section which can be brought into transport-securing interaction with an opposed transport-securing section on said gripping element.

19. A pressure plate assembly as in claim 18 wherein said opposing transport-securing section is provided on said gripping element where contact with said blocking element occurs.

20. A pressure plate assembly as in claim 19 wherein said gripping element comprises a blocking section where contact with said blocking element occurs, said blocking section extending between said adjusting element and said pressure plate, said transport-securing section of said adjusting element extending toward said pressure plate.

21. A pressure plate assembly as in claim 18 wherein said transport-securing interaction can be produced by moving the pressure plate relative to the housing beyond the normal installation position.

22. A pressure plate assembly as in claim 18 wherein said adjusting element has an opening and said arresting element comprises an arresting interaction area which engages in said opening with clearance in the adjusting direction.

23. A pressure plate assembly for a friction clutch, comprising:
- a housing having an axis of rotation;
- a pressure plate mounted in said housing with freedom to move axially relative to said housing;
- a stored energy element mounted in said housing and transmitting force along a path from said housing to said pressure plate;
- a wear-compensating device in the path of force transmission, said wear-compensating device comprising at least one adjusting element which is movable in an adjusting direction to compensate for wear;
- a blocking element which can be fixed in position relative to said housing;
- a gripping element attached to said pressure plate, said gripping element blocking said at least one adjusting element against movement in said adjusting direction before wear occurs, said gripping element coming into contact with said blocking element when wear occurs, and
- an arresting element which can be shifted in an arresting direction when said gripping element comes into contact with said blocking element, thereby arresting the gripping element in a position corresponding to the amount of wear which has occurred, said arresting element comprising a transport securing section which cooperates with said adjusting element to prevent moving the adjusting element in the adjusting direction prior to attaching the housing to a centrifugal mass, and an arresting interaction area which permits relative movement between the adjusting element and the arresting element when wear occurs, said transport securing section allowing essentially no relative movement between the adjusting element and the arresting element prior to attaching the housing to the centrifugal mass.

24. A pressure plate assembly as in claim 23 wherein the adjusting element comprises an elongate opening extending in the adjusting direction and having a length which is longer than the arresting interaction area, said arresting interaction area engaging in said opening during operation, the transport securing section having a length in the adjusting direction which is essentially the same as the length of the opening.

25. A pressure plate assembly as in claim 24 wherein said arresting interaction area extends essentially radially into said elongate opening, and said transport-securing section extends radially from said arresting interaction area.

26. A pressure plate assembly as in claim 24 wherein said transport-securing section is disengageable from said opening by the action of centrifugal force.

27. A pressure plate assembly as in claim 23 further comprising means for producing a release force in a direction opposite to the force transmitted by said stored energy element, said release force preventing said adjusting element from moving by itself in the adjusting direction.

* * * * *